US010673580B2

(12) United States Patent
Ramalho et al.

(10) Patent No.: US 10,673,580 B2
(45) Date of Patent: Jun. 2, 2020

(54) TECHNIQUES FOR INFORMING COMMUNICATIONS NETWORKS OF DESIRED PACKET TRANSPORT TREATMENT

(71) Applicant: CISCO TECHNOLOGY, INC., San Jose, CA (US)

(72) Inventors: Michael A. Ramalho, Lakewood Ranch, FL (US); Jon M. Snyder, Portland, OR (US); Kashyap Kodanda Ram Kambhatla, San Jose, CA (US); Pal-Erik Martinsen, As (NO); Wai-tian Tan, Sunnyvale, CA (US); Paul Edwin Jones, Apex, NC (US)

(73) Assignee: Cisco Technology, Inc., San Jose, CA (US)

( * ) Notice: Subject to any disclaimer, the term of this patent is extended or adjusted under 35 U.S.C. 154(b) by 253 days.

(21) Appl. No.: 15/366,814

(22) Filed: Dec. 1, 2016

(65) Prior Publication Data

US 2018/0159777 A1 Jun. 7, 2018

(51) Int. Cl.
*H04L 1/18* (2006.01)
*H04L 29/12* (2006.01)
*H04W 28/02* (2009.01)

(52) U.S. Cl.
CPC ............ *H04L 1/189* (2013.01); *H04L 1/188* (2013.01); *H04L 61/2575* (2013.01); *H04L 61/2514* (2013.01); *H04W 28/0263* (2013.01)

(58) Field of Classification Search
None
See application file for complete search history.

(56) References Cited

U.S. PATENT DOCUMENTS

| | | | |
|---|---|---|---|
| 7,461,164 B2 * | 12/2008 | Edwards | H04L 47/10 709/236 |
| 9,253,237 B2 | 2/2016 | Wing et al. | |
| 2011/0138458 A1 | 6/2011 | Kumar et al. | |
| 2014/0006604 A1 | 1/2014 | Wegger et al. | |
| 2014/0006639 A1 | 1/2014 | Wing et al. | |
| 2014/0126406 A1 * | 5/2014 | Ibanez | H04L 41/5025 370/252 |
| 2014/0301378 A1 * | 10/2014 | Xu | H04L 41/12 370/338 |
| 2015/0120879 A1 | 4/2015 | Yoakum et al. | |
| 2016/0182357 A1 | 6/2016 | Martinsen et al. | |
| 2017/0303159 A1 * | 10/2017 | Ma | H04L 1/0001 |
| 2017/0359268 A1 * | 12/2017 | Chan | H04L 47/6275 |

\* cited by examiner

*Primary Examiner* — Robert M Morlan
(74) *Attorney, Agent, or Firm* — Patterson + Sheridan, LLP

(57) ABSTRACT

A method is described and in one embodiment includes receiving at a first node in a communications network a message associated with a first flow, wherein the message comprises a flow treatment attribute including metadata indicative of how the first flow should be treated in the network; analyzing the flow treatment attribute at the first node; setting policy for treatment of the flow in the network based on the analyzing; and forwarding the message to a next network node.

20 Claims, 7 Drawing Sheets

TECHNIQUES FOR INFORMING COMMUNICATIONS NETWORKS OF DESIRED PACKET TRANSPORT TREATMENT

TECHNICAL FIELD

This disclosure relates in general to the field of communications networks and, more particularly, to techniques informing such networks of desired packet transport treatment.

BACKGROUND

Cellular networks are characterized by factors such as errors and packet loss, which are impossible to predict. As a result, technologies such as LTE include a number of mechanisms to correct errors (e.g., link layer FEC) and to retransmit packets (e.g., ARQ and HARQ mechanisms). In order to utilize real-time audio/video over a network technology such as LTE, quality of service ("QoS") is necessary, but most mobile devices do not include a way for a user's applications to request modification of the transport mechanisms to take QoS guarantees into account. Real-time video conferencing solutions are latency sensitive in the sense that delayed packets become outdated and lose relevance at the decoder once the time for rendering the data has passed. Hence, there may not be much benefit in re-transmitting outdated data by network elements. In some instances, retransmission attempts at cellular network elements such as eNBs, home eNBs (HeNBs) may be more harmful than simply ignoring the missed and/or corrupted packet. Cellular network endpoints/UEs do not currently have a way to obtain high QoS treatment for their audio/video media flows.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method is described and in one embodiment includes receiving at a first node in a communications network a message associated with a first flow, wherein the message comprises a flow treatment attribute including metadata indicative of how the first flow should be treated in the network; analyzing the flow treatment attribute at the first node; setting policy for treatment of the flow in the network based on the analyzing; and forwarding the message to a next network node.

Example Embodiments

Figure 1:
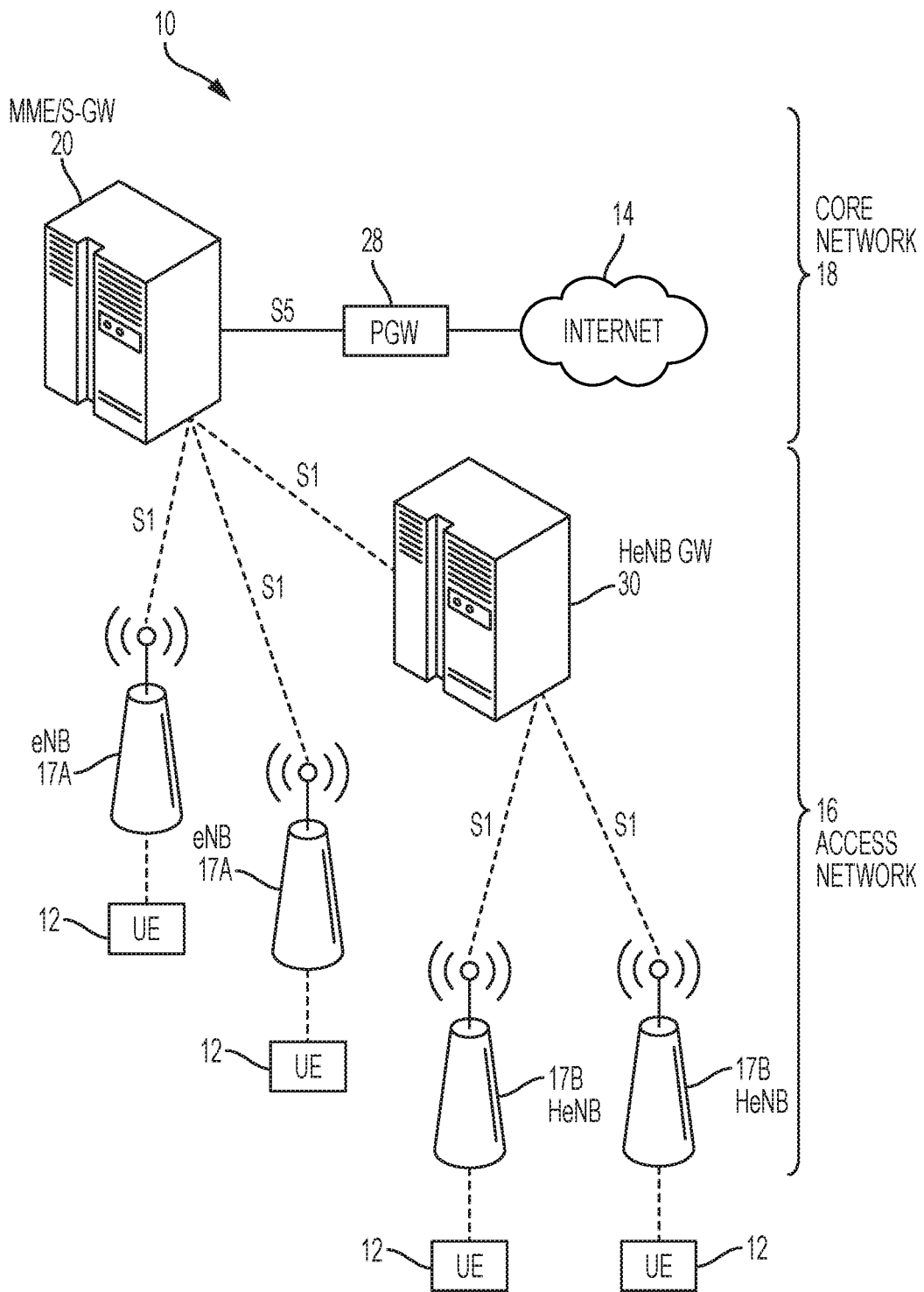
FIG. 1 is a simplified block diagram of a portion of a communications network in which techniques for informing the network of desired packet transport treatment in accordance with embodiments described herein.

Turning to FIG. 1, FIG. 1 is a simplified block diagram of a portion of a communications network 10 in which techniques for informing the network of desired packet transport treatment in accordance with embodiments described herein. In one embodiment, at least a portion of the network 10 may be implemented as a Long Term Evolution ("LTE") network. As illustrated in FIG. 1, the network 10 enables one or more user equipment ("UE"), represented in FIG. 1 by UE 12, to be connected to communicate data to and from the Internet 14 via a radio access network ("RAN") 16 comprising a plurality of RAN nodes, represented in FIG. 1 by eNBs 17A and HeNBs 17B, and a core network 18. In the illustrated embodiment, the RAN 16 is implemented as an E-UTRAN. In one embodiment, the core network 18 may be implemented using an Evolved Packet Core ("EPC") network as defined in 3GPP TS 23.401 and employing a user plane protocol GTPv1-U. It will be understood, however, that other implementations of the core network 18 may be employed in accordance with the features described herein.

As illustrated in FIG. 1, the core network 18 may include a mobility management entity ("MME") 20, which is responsible for control plane functions related to subscriber and session management and may be connected to a home subscriber service ("HSS") (not shown), which supports a database that includes user subscription information, through an S6a interface. The core network 18 may further include a serving GPRS support node (not shown) connected to the MME 20 via an S3 interface for providing functionality related to packet-data switching.

The core network 18 may further include a serving gateway ("S-GW"), which in the illustrated embodiment is co-located with the MME 20 and which serves as the termination point of the user plane interface S1-U toward the RAN network 16, and a PDN gateway ("PGW") 28, which serves as an interface to the Internet 14, sending user data from the user toward the Internet and receiving data destined for the user from the Internet. In addition, the PGW 28 supports policy enforcement features that apply operator-defined rules for resource allocation and usage, as well as packet filtering and inspection and charging support. The PGW 28 may interface with a policy charging rule function ("PCRF") (not shown), which manages the service policy and provides QoS information for each user session. It will be recognized that the core network 18 may provide a variety of functionality in the network 10, including, for example, one or more of aggregation, user authentication, call control and switching, accounting and charging, service invocation, and gateways.

As previously noted, in one embodiment and by way of non-limiting example only, the network 10 may be implemented in accordance with the Long-Term Evolution ("LTE") standard. E-UTRAN provides the radio access in the LTE network and is designed to improve end-user throughputs and sector capacity and reduce user plan latency, bringing significantly improved user experience with full mobility. With the emergence of IP as the protocol of choice for all types of traffic, LTE provides support for IP-based traffic with end-to-end QoS. E-UTRAN supports various types of services, including web browsing, FTP, video streaming, VoIP, online gaming, real time video, push-to-talk, and push-to-view, for example.

UE 12 can be associated with clients, customers, or end users wishing to initiate a communication in communication network 10 via some network. The term "user equipment" is inclusive of devices used to initiate a communication, such as a computer, a personal digital assistant (PDA), a laptop or electronic notebook, a cellular telephone, an iPhone, an IP phone, or any other device, component, element, or object capable of initiating voice, audio, video, media, or data exchanges either within communication network 10 or to end-users in the IP network outside communication network 10. UE 12 may also be inclusive of a suitable interface to the human user, such as a microphone, a display, or a keyboard or other terminal equipment. UE 12 may also be any device that seeks to initiate a communication on behalf of another entity or element, such as a program, a database, or any other component, device, element, or object capable of initiating an exchange within communication network 10. Data, as used herein in this document, refers to any type of numeric, voice, video, media, or script data, or any type of source or object code, or any other suitable information in any appropriate format that may be communicated from one point to another. On power up, UE 12 can be configured to initiate a request for a connection with a service provider. A user agreement can be authenticated by the service provider based on various service provider credentials (e.g., subscriber identity module ("SIM"), Universal SIM ("USIM"), certifications, etc.). More specifically, a device can be authenticated by the service provider using some predetermined financial relationship.

In general terms, S-GW portion of MME/S-GW 20 may be configured to route and to forward user data packets, while also acting as the mobility anchor for the user plane during inter-eNodeB handovers. Additionally, S-GW can act as the anchor for mobility between LTE and other 3GPP technologies. MME portion of MME/S-GW 20 can be configured to operate as a control node for the LTE access-network. It further can be responsible for idle mode UE tracking and paging procedures (including, for example, retransmissions). Furthermore, MME 20 can be involved in the bearer activation/deactivation process and can be responsible for choosing S-GW for UE 12 at the initial attach (and at time of an intra-LTE handover involving core network node relocation). MME 20 can also be responsible for authenticating the user by interacting with HSS 22. MME 20 also provides the control plane function for mobility between LTE and 2G/3G access networks.

Other functions of the MME 20 may include generating and allocating temporary identities to UEs, terminating Non-Access Stratum ("NAS") signaling, checking the authorization of UE 12 to camp on a service provider's Public Land Mobile Network ("PLMN"), and enforcing UE roaming restrictions. MME 20 serves as the termination point in the network for ciphering/integrity protection for NAS signaling and handles the security key management. Lawful interception of signaling is also supported by MME 20.

In regard to particular applications involving UE 12, media servers comprising one or more video servers may be provided, which can provide streaming video to an individual associated with UE 12 via the Internet 14. For example, an individual could be uploading video over the network to which UE 12 is connected. This could involve non-interactive video conveyance such as mobile phone recorded video, webcams, YouTube, and various other video technologies. We note that the uploading of these non-interactive videos typically does not have tight delay/latency requirements. In contrast to this, other forms of interactive media, such as the video component of a video conference, would prefer the prioritization of the minimization of delay over maximization of bandwidth. It is a goal of embodiments described herein to convey preferences such as these to the cellular data network effectively via special signaling to be described below.

For purposes of illustrating certain example techniques of communication network 10, it is important to understand the communications, including control signals, that may be traversing the network and the overload situations that can occur at various points in the network 10 due to such communications. It will be understood that, after a subscriber data session has been established in a conventional fashion between the UE 12 and the Internet 14, data packets from the UE 12 are encapsulated by the RAN node 17 in accordance with GTPv1-U and forwarded on to S-GW and PGW. The S-GW and PGW decapsulates the user data packets from GTPv1-U tunnel between the RAN node 17 and the S-GW and PGW and forwards them to Internet 14. Conversely, data packets intended for the UE 12 are transmitted to the UE from the Internet 14 via the S-GW and PGW, which encapsulates the same in accordance in GTPv1-U tunnel towards the RAN node, and the RAN node 17 decapsulates the data packets upon receipt thereof.

The LTE standard includes a radio access network that employs a technology called evolved universal terrestrial radio access network ("EUTRAN") for communicating to UEs and a System Architecture Evolution ("SAE") core network. As part of the EUTRAN, an eNB provides a wireless air interface for bridging UEs to the SAE core network over a wired connection. The SAE core network includes management gateways such as the MME, forwarding gateways such as the S-GW, and PGWs.

In operation, when a UE 12 requests IP services, an IP connectivity access network bearer, or evolved packet switch ("EPS") bearer, is required to provide connectivity from UE to S-GW and back, effectively establishing an end-to-end IP path associated with a specific QoS. Parts of the EPS bearer may use IP tunneling. The EPS bearer is similar to a packet data protocol ("PDP") context in the general packet radio service ("GPRS") core network and includes a radio bearer between UE 12 and E-UTRAN 16, an S1 bearer between E-UTRAN 16 and S-GW 20, and an S5/S8 bearer between S-GW and PGW. A generic IP tunnel or IP path may substitute for a bearer in some embodiments.

The EPS bearer includes a data structure maintained by MME/S-GW 20, which includes subscriber information and session information for identifying the traffic flow carried by the bearer. When data is delivered from the core network to S-GW, S-GW uses bearer information to direct the incoming packets to the correct UE, such as UE 12. UE 12 likewise attaches bearer information to IP traffic bound for the core network, which S-GW uses to maintain IP sessions and direct packets to their destinations. The bearer also carries QoS information that applies to the traffic flow carried by the bearer.

When UE 12 initially attaches to E-UTRAN 16, UE 12 requests IP connectivity, and a bearer may be allocated by MME/S-GW 20 for providing IP services. The bearer is created, allocated, and tracked by MME 20 so that when UE 12 moves from one RAN to another, it can maintain the same bearer at MME 20. Data is sent via the bearer in conjunction with a S1-U tunnel from S-GW 20 to attached RAN node 17. If UE 12 goes idle, RAN node 17 and S-GW 20 are permitted to deallocate radio resources.

In accordance with features of embodiments described herein, Session Traversal Utilities for Network Address Translation ("STUN"), as defined in RFC 5389, messages are used to convey information about an application's media flow that may be used to determine how the flow may best be accommodated by the core network. STUN is lightweight request-response network protocol that allows an application running on a host to determine whether or not it is located behind a Network Address Translation device ("NAT"). STUN is used to enable NAT traversal for such applications as real-time voice, video, messaging, and other interactive IP communications and is intended to be used as a tool by other protocols, such as a tool to be used by other protocols, such as Interactive Connectivity Establishment ("ICE").

The STUN protocol enables applications executing behind a NAT or chain of NATs to discover the outermost Internet-facing NAT and to obtain the mapped, or public, IP address and port number that that NAT has allocated for the application's User Datagram Protocol ("UDP") connections to remote hosts. The STUN protocol requires assistance from a third-party network server, which in some embodiments may be implemented as a STUN server, located on the opposing side of the NAT, usually the public Internet. In contrast, when ICE is in use, both clients will run their own client and server. Some packets may be sent to open up pin-holes for incoming traffic and are not expected to make it to the other end. Some may eventually do so, however, as pinholes might have been opened up in both ends)

In general, the STUN protocol operates as follows. First, a client sends a message, or "binding request," to a STUN server on the public Internet. Next, the STUN server responds with a "success response" the payload of which includes the IP address and port of the client as observed from the perspective of the STUN server. The result will be obfuscated through XOR mapping to work around NATs that indiscriminately translate payload IP addresses present in STUN responses.

STUN messages are usually sent in User Datagram Protocol (UDP) packets. Since UDP does not provide reliable transport guarantees, reliability is achieved by application-controlled retransmissions of the STUN requests. STUN servers do not implement any reliability mechanism for their responses. When reliability is mandatory, Transmission Control Protocol ("TCP") may be used, but induces extra networking overhead. In security-sensitive applications, STUN may be transported and encrypted by Transport Layer Security ("TLS"). In addition to using protocol encryption via TLS, STUN also has built-in authentication and message-integrity mechanisms via specialized STUN packet types. DTLS may also be used for STUN message transport.

When a client has discovered its external address, it can use this as a candidate for communicating with peers by sharing the external NAT address rather than the private address (which is, by definition, not reachable from peers on the public network). (This may also be accomplished using TURN, a STUN extension, in which case the client will then send an allocation request to a TURN server and get a relay and reflexive (mapped) address back. If both peers are located in different private networks behind a NAT, the peers must coordinate to determine the best communication path between them. Some NAT behavior may restrict peer connectivity even when the public binding is known. The Interactive Connectivity Establishment ("ICE") protocol provides a structured mechanism to determine the optimal communication path between two peers. Session Initiation Protocol ("SIP") extensions may be defined to enable use of ICE when setting up a call between two hosts.

As previously noted, in certain embodiments, STUN messages are used to convey information about an application's media flow, including information regarding how the flow may be best accommodated by the cellular network. In one embodiment, a STUN message may be sent along the same 5-tuple as the media stream flow itself, thereby inherently providing each node of the communications path with Layer 3 ("L3") and Layer 4 ("L4") information for the flow. As will be described below, additional STUN attributes may indicate the expected average and maximum bitrates for the flow, thereby to enable the cellular network to make decisions about the flow.

In the context of content, mobile, fixed service, service providers, enterprise and private networks have a need to prioritize packet flows end-to-end. Such flows are often dynamic, time-bound, encrypted, peer-to-peer, possibly asymmetric, and might have different priorities depending on network conditions, direction, time of day, dynamic user preferences and other factors, which may be time-variant and therefore need to be signaled. Moreover, in some cases of peer-to-peer communication, flow information is known only to the endpoint. These considerations, coupled with the trend to use end-to-end encryption, imply that access lists, deep packet inspection and other static prioritization methods cannot be employed successfully to prioritize packet flows and optimize resource usage across a network. There is a need for a solution that is easy for application developers to use and that is able to cross administrative domains without the risk of being rewritten.

In accordance with features of embodiments described herein, the above-noted considerations and others may be accomplished using STUN attributes that may be added to any STUN message an application executing on a UE sends. STUN messages are typically sent during the ICE candidate gathering phase (TURN allocates request to a TURN server but can also just be a binding request to a public STUN server), connectivity check phase when a media session is established or as keep-alive STUN messages after the session is established; however, an application may send STUN messages any time communication between the application and the network is needed. In accordance with features of embodiments described herein, devices on the media path can use the information in the STUN attributes to perform a variety of operations.

In certain embodiments, one or more of a variety of attributes may be added to a STUN message, including, for example, STREAM-TYPE, BANDWIDTH-USAGE, DELAY-TOLERANCE, LOSS-TOLERANCE and NETWORK-STATUS. Adding these attributes to a STUN request-response pair allows information gathered to be sent back to the requesting agent in a STUN response. The STREAM-TYPE, BANDWIDTH-USAGE, DELAY-TOLERANCE, LOSS-TOLERANCE attributes may be added before an INTEGRITY attribute to prevent tapering with the contents of those attributes. In certain embodiments, if the client wants feedback from the network, it may add an empty NETWORK-STATUS attribute after the INTEGRITY attribute, enabling on-path devices to write information thereto.

STREAM-TYPE attribute may identify stream type (e.g., audio, video, application data, other) and interactivity type (e.g., undefined, stream (broadcast or one way), interactive). BANDWIDTH-USAGE attribute may identify the expected sustained bandwidth usage for the stream and the maximum bandwidth usage for the stream. STREAM-PRIORITY may define the priority of the stream with respect to other streams from the same UE/application. NETWORK-STATUS attribute may identify the level of congestion the network element is experiencing at the moment. If an agent receives a STUN response with a NETWORK-STATUS attribute before the INTEGRITY attribute, the NETWORK-STATUS attribute describes the stream in the upstream direction. A NETWORK-STATUS attribute after the INTEGRITY attribute describes the stream in the downstream direction.

Figure 2:
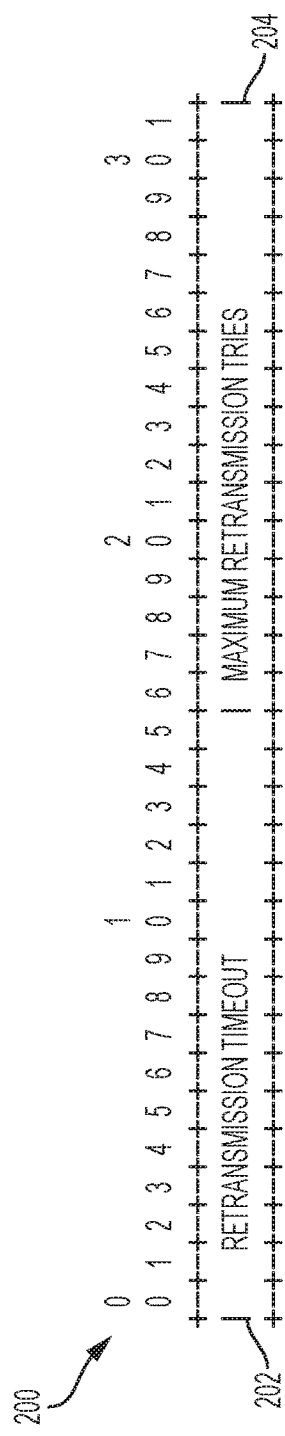
FIG. 2 is a simplified diagram of the packet format of the FLOW-TREATMENT attribute for informing the network of desired packet transport treatment in accordance with embodiments described herein.

In certain embodiments, a new STUN attribute, designated herein as "FLOW-TREATMENT," enables an application to indicate to the communications network that retransmissions should be attempted only up to a maximum amount of time. FIG. 2 is a simplified diagram of the format of the FLOW-TREATMENT attribute 200 in accordance with embodiments described herein.

As shown in FIG. 2, the FLOW-TREATMENT attribute 200 may include a field designated "Retransmission Time-Out" ("RTO") 202, the value in which indicates a maximum amount of time that a packet may exist in a queue of a network element (in the packet core or backhaul network). After a packet has remained in a queue of a network element for the amount of time indicated in the RTO field 202, the packet should be removed from the queue and discarded. In one embodiment, the RTO value is specified in increments of 100 microseconds (0.1 ms).

The FLOW-TREATMENT attribute 200 may also include a field designated "Maximum Retransmission Tries" ("MRT") 204, the value in which indicates the maximum number of tries that retransmission of the queued packet can be attempted, after which, the packet will be removed from the queue and discarded. It will be recognized that, in some embodiments, only one or the other of the RTO field 202 and MRT field 204 will be included (and/or contain a value). In embodiments in which both fields 202, 204, are included (and/or contain a value), the packet may be deleted from the queue once both conditions are met.

The FLOW-TREATMENT attribute 200 is specifically focused on controlling (i.e., limiting) retransmissions and/or latency; however, the metadata contained therein (which indicates the relative priorities of latency and reliability) and the fact that the message containing the attribute is sent is on-path and thus identifies the flow's 5-tuple, may also be used to trigger other behaviors on the network path. It is also possible for additional extensions to be defined and carry other useful metadata and/or fields. For example, by observing the metadata included in the STUN messages, certain nodes of a cellular network, such as that illustrated in FIG. 1, may choose to treat the corresponding traffic differently, such as by placing it into a new dedicated bearer with QCI 2. The network (P-GW sends QoS parameters and Create Dedicated Bearer Request to S-GW which in turn forwards the request to the MME) may initiate the establishment of a new dedicated bearer for this traffic, using a Create Dedicated Bearer Request message. It is also possible for the UE to initiate the request, via a Request Bearer Resource Modification message (creation of dedicated bearer is contingent subscription status of the UE verified by MME and/or the application satisfies the required QoS level and relevant PCC rules verified by P-GW with the PCRF); the network can then use the information included in the STUN message to authorize the Create Dedicated Bearer request. This operation may be improved even further by including a Traffic Class Label or other granular traffic classification metadata in one or more appropriate fields in the FLOW-TREATMENT attribute. The cellular data network may also choose to mark the traffic with an appropriate Differentiated Services Code Point ("DSCP") value to provide preferential treatment on the packet core and backhaul networks. It could also alter the eNB scheduler to give preference to a UE sending the indicated flow.

Figure 3A:
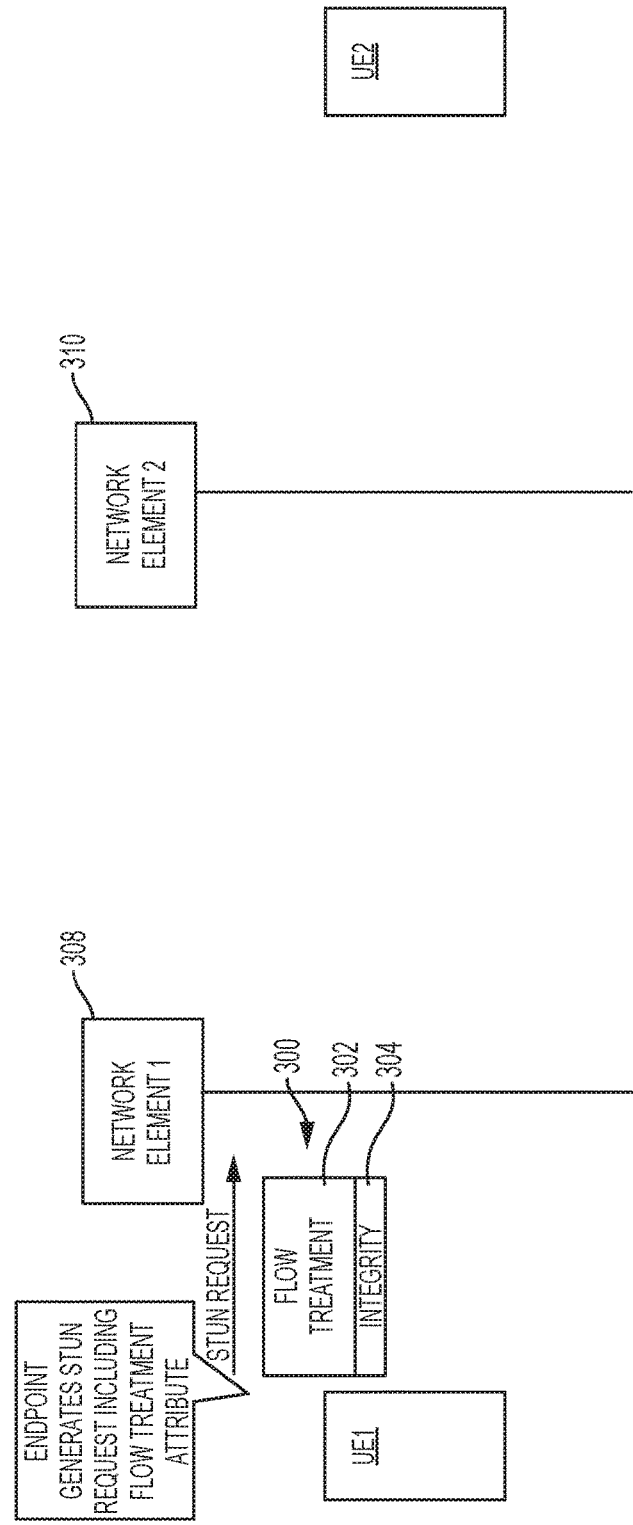
FIGS. 3A-3D collectively illustrate techniques for enabling applications to inform a communications network of desired transport treatment in accordance with embodiments described herein.
Figure 3B:
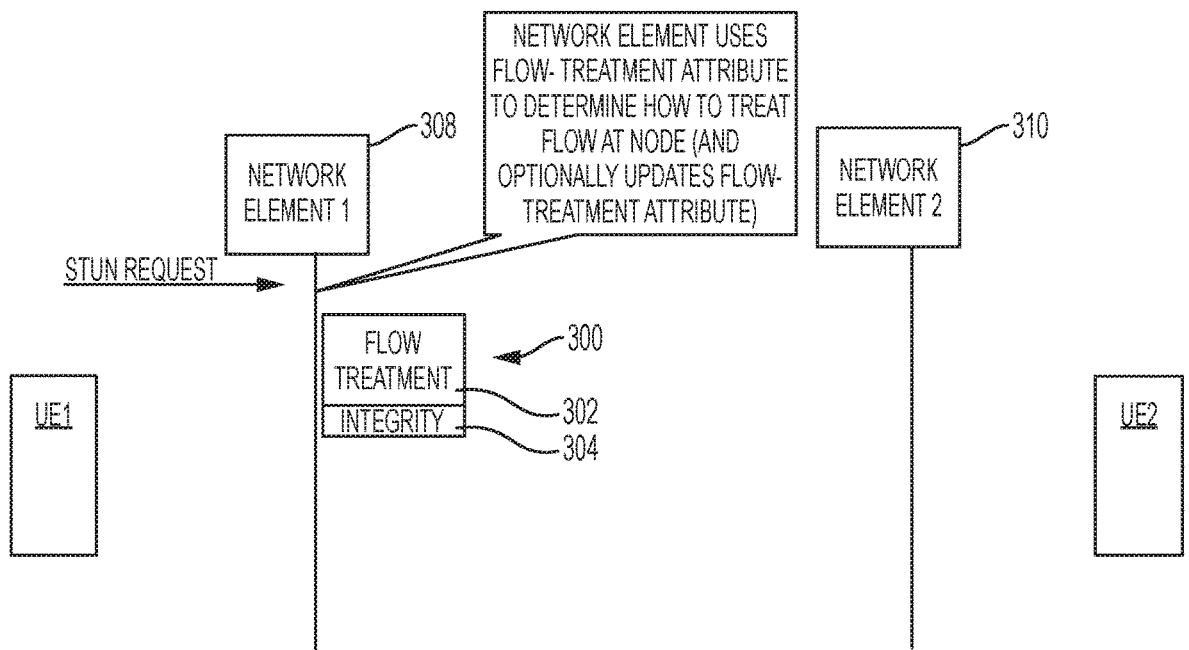
Figure 3C:
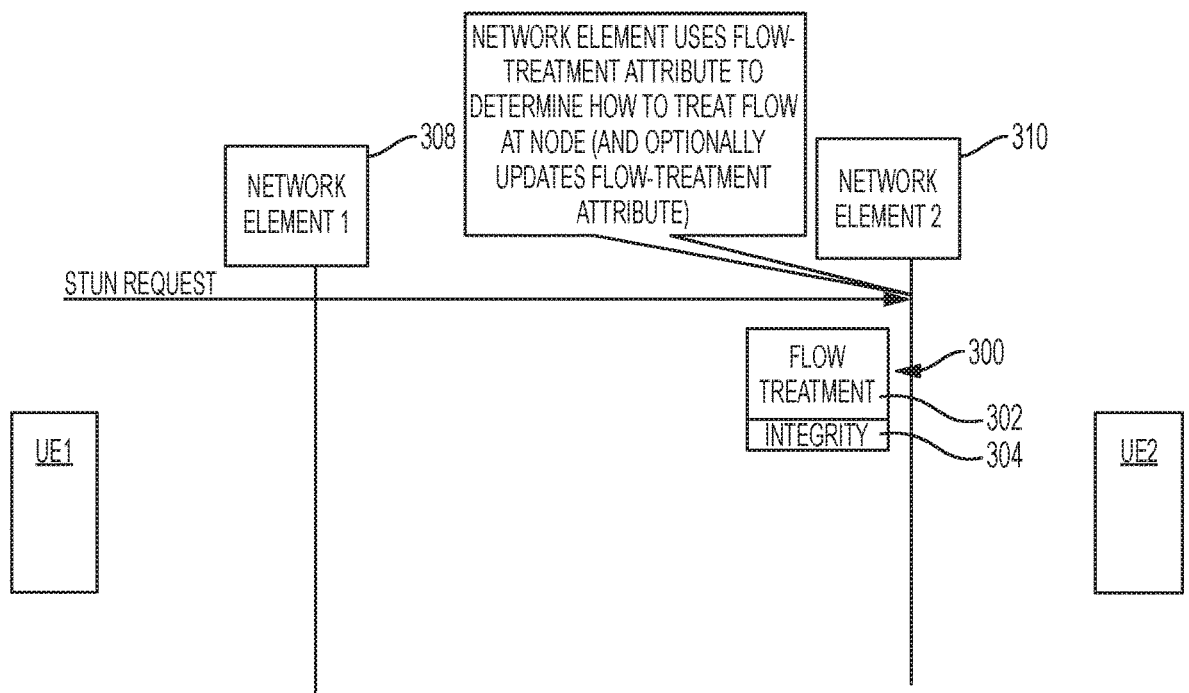
Figure 3D:
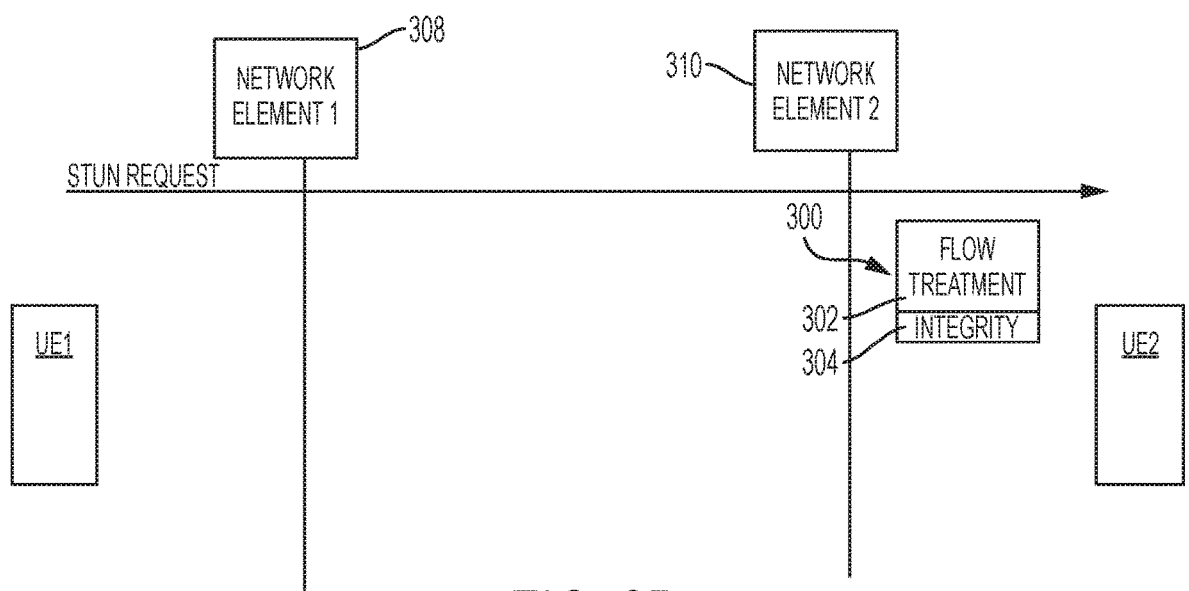

FIGS. 3A-3D collectively illustrate an embodiment of techniques for enabling applications to inform a communications network of desired transport treatment. Referring to FIG. 3A, UE1 creates a STUN request 300 and adds a number of attributes, including, for example, a FLOW-TREATMENT attribute 302, before an INTEGRITY attribute 304. The STUN request 300 is sent to a first network node 308. Referring now to FIG. 3B, network node 308 inspects the received STUN request 300 and reads the attributes and the information contained therein. In particular, network node 308 reads the FLOW-TREATMENT attribute 302 and uses the values included in the RTO and/or the MRT fields thereof to determine how to treat packets of the associated flow at the node 308, as will be described in greater detail below. In some embodiments, network node 308 may optionally update the FLOW-TREATMENT attribute before forwarding the STUN request 300 to a network node 310. For example, in one embodiment, an application may specify an RTO of 30 ms, and the network path may involve traversing two network elements. Assuming packets of the application are held for (an average or maximum time of) 20 ms at the first network element, the first network element would subtract 20 ms from the RTO value of 30 ms and update the RTO value to 10 ms before forwarding the STUN request to the second network element, which would work with the remaining 10 ms leeway in transmission time. Referring now to FIG. 3C, network node 310 reads the FLOW-TREATMENT attribute 302 and uses the values included in the RTO and/or the MRT fields thereof to determine how to treat packets of the associated flow at the node 310, as will be described in greater detail below. In some embodiments, network node 308 may optionally update the FLOW-TREATMENT attribute before forwarding the STUN request 300 to a UE2. Referring now to FIG. 3D, UE2 processes the STUN request 300.

Figure 4:
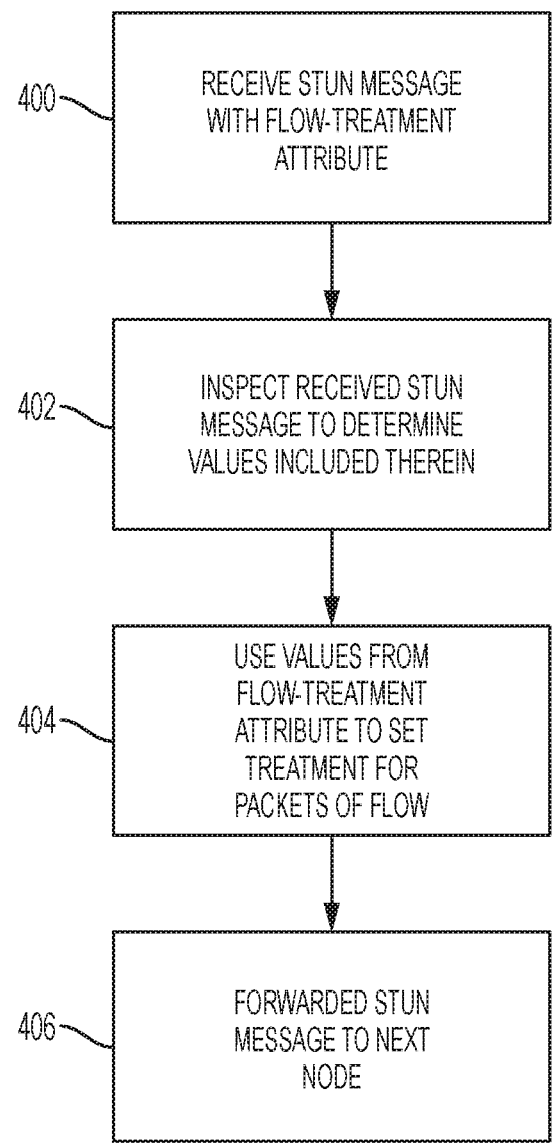
FIG. 4 is a flowchart illustrating steps performed at a network element for implementing techniques for informing communications networks of desired packet transport treatment in accordance with embodiments described herein.

FIG. 4 is a flowchart illustrating steps performed at a network element for implementing techniques for informing communications networks of desired packet transport treatment in accordance with embodiments described herein. In step 400, a STUN message that includes a FLOW-TREATMENT attribute is received at the network element. In step 402, the network element inspects the received STUN message to determine the values included in the FLOW-TREATMENT attribute. In particular, the network element determines the values included in the RTO and/or the MRT fields. In step 404, the value is used to control retransmissions of packets of the flow at the network element based on the values contained in the RTO and/or the MRT fields, which may indicate a maximum amount of time a packet may remain in a queue at the network element before it is discarded or the maximum number of retransmission attempts that may be made with respect to a packet before it must be discarded. As noted above, the FLOW-TREATMENT attribute is specifically focused on controlling (i.e., limiting) retransmissions; however, the metadata contained therein and the fact that the message containing the attribute is sent is on-path and thus identifies the flow's 5-tuple, may also be used to trigger other behaviors on the network path. It is also possible for additional extensions to be defined and carry other useful metadata. For example, by observing these STUN messages, the network element may choose to treat the corresponding traffic flow differently, such as by placing it into a new dedicated bearer with QCI 2. The network element may initiate the establishment of a new dedicated bearer for this traffic, using a Create Dedicated Bearer Request message. In addition, network elements could add DSCP markings to packets, which might be useful in affecting the behavior of the core network. Over the RAN, adjustments could be made in packet scheduling. In effect, anything that might be done to change the treatment of the flow as it passes through any point along the network path could be adjusted based on the values observed in the STUN packet.

It is also possible for the UE to initiate the request, via a Request Bearer Resource Modification message; the network element can then use the information included in the STUN message to authorize the Create Dedicated Bearer request. This operation may be improved even further by including a Traffic Class Label or other granular traffic classification metadata in one or more appropriate fields in the FLOW-TREATMENT attribute. The network element may also choose to mark the traffic flow with an appropriate DSCP value to provide preferential treatment on the packet core and backhaul networks. If the network element is an eNB, the eNB scheduler could also be altered to give preference to a UE sending the indicated flow. Returning to FIG. 4, prior to, concurrently with, or subsequent to step 404, in step 406, the STUN message is forwarded along the traffic path to the next element.

Figure 5:
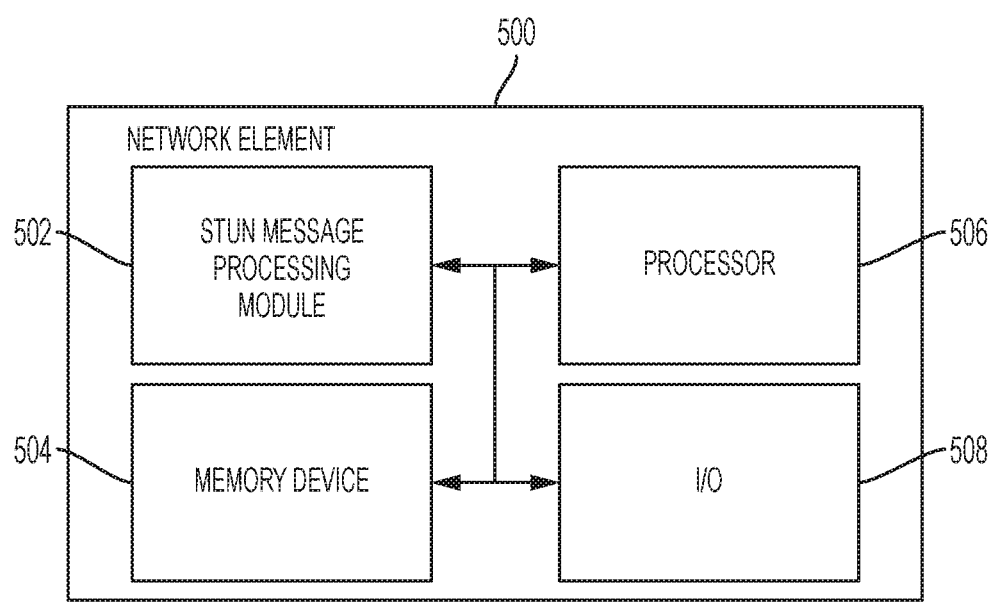
FIG. 5 is a simplified block diagram of a network element for implementing techniques for informing communications networks of desired packet transport treatment in accordance with embodiments described herein.

FIG. 5, illustrated therein is network element 500, which in certain embodiments may be a node of a cellular network, such as the cellular network shown in FIG. 1 or the network elements 308, 310. In accordance with features of embodiments described herein, the network element 500 includes a STUN message processing ("SMP") module 502, which may include software embodied in one or more tangible media for facilitating the activities described herein. In particular, the module 502 may include software for facilitating the processes illustrated in and described with reference to FIG. 4. The network element 500 may also include a memory device 504 for storing information to be used in achieving the functions as outlined herein. Additionally, the network element 500 may include a processor 506 that is capable of executing software or an algorithm (such as embodied in module 502) to perform the functions as discussed in this Specification. The network element 500 may also include various I/O 508 necessary for performing functions described herein.

It will be recognized that the network element 500 shown in FIG. 5, as well as other network devices shown and described herein, may be implemented using one or more computer devices comprising software embodied in one or more tangible media for facilitating the activities described herein. These devices may further keep information in any suitable memory element (random access memory ("RAM"), ROM, EPROM, EEPROM, ASIC, etc.), software, hardware, or in any other suitable component, device, element, or object where appropriate and based on particular needs. Any of the memory items discussed herein should be construed as being encompassed within the broad term "memory element." Similarly, any of the potential processing elements, modules, and machines described in this Specification should be construed as being encompassed within the broad term "processor." Each of the network elements can also include suitable interfaces for receiving, transmitting, and/or otherwise communicating data or information in a network environment.

Note that in certain example implementations, the functions outlined herein and specifically illustrated in FIG. 4 may be implemented by logic encoded in one or more tangible media (e.g., embedded logic provided in an application specific integrated circuit ("ASIC"), digital signal processor ("DSP") instructions, software (potentially inclusive of object code and source code) to be executed by a processor, or other similar machine, etc.). In some of these instances, a memory element can store data used for the operations described herein. This includes the memory element being able to store software, logic, code, or processor instructions that are executed to carry out the activities described in this Specification, including but not limited to the functions illustrated in and described with reference to FIG. 4. A processor can execute any type of instructions associated with the data to achieve the operations detailed herein in this Specification. In one example, the processor could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array ("FPGA"), an erasable programmable read only memory ("EPROM"), an electrically erasable programmable ROM ("EEPROM")) or an ASIC that includes digital logic, software, code, electronic instructions, or any suitable combination thereof.

It should be noted that much of the infrastructure discussed herein can be provisioned as part of any type of network element. As used herein, the term "network element" or "network device" can encompass computers, servers, network appliances, hosts, routers, switches, gateways, bridges, virtual equipment, load-balancers, firewalls, processors, modules, or any other suitable device, component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information.

In one implementation, network elements/devices can include software to achieve (or to foster) the management activities discussed herein. This could include the implementation of instances of any of the components, engines, logic, etc. shown in the FIGURES. Additionally, each of these devices can have an internal structure (e.g., a processor, a memory element, etc.) to facilitate some of the operations described herein. In other embodiments, these management activities may be executed externally to these devices, or included in some other network element to achieve the intended functionality. Alternatively, these network devices may include software (or reciprocating software) that can coordinate with other network elements in order to achieve the management activities described herein. In still other embodiments, one or several devices may include any suitable algorithms, hardware, software, components, modules, interfaces, or objects that facilitate the operations thereof.

Figure 6:
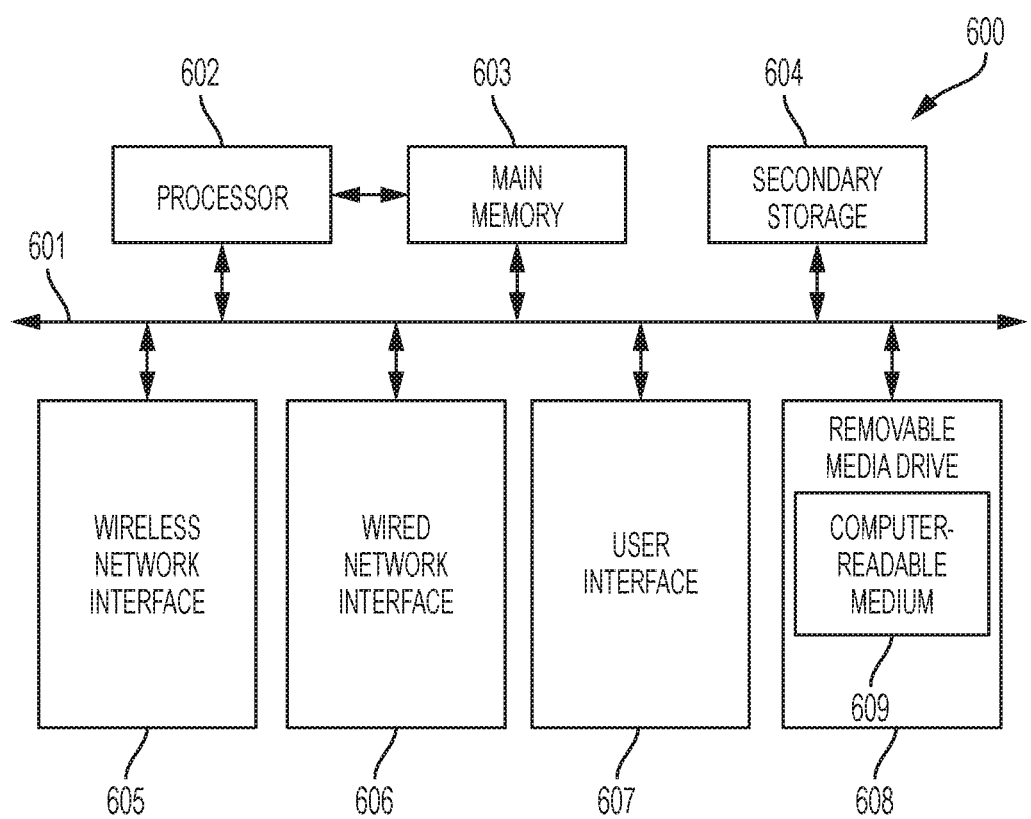
FIG. 6 illustrates a machine comprising an element of the various networks described herein in which embodiments described herein for implementing techniques for informing communications networks of desired packet transport treatment in accordance with embodiments described herein.

Turning to FIG. 6, illustrated therein is a simplified block diagram of an example machine (or apparatus) 600 that may be implemented as an element of a system for use in implementing a technique for enabling dynamic update of network device data models in accordance with embodiments described herein. The example machine 600 corresponds to network elements and computing devices that may be deployed in any one of the networks illustrated and described herein, such as network 10, including network elements shown therein. In particular, FIG. 6 illustrates a block diagram representation of an example form of a machine within which software and hardware cause machine 600 to perform any one or more of the activities or operations discussed herein. As shown in FIG. 6, machine 600 may include a processor 602, a main memory 603, secondary storage 604, a wireless network interface 605, a wired network interface 606, a user interface 607, and a removable media drive 608 including a computer-readable medium 609. A bus 601, such as a system bus and a memory bus, may provide electronic communication between processor 602 and the memory, drives, interfaces, and other components of machine 600.

Processor 602, which may also be referred to as a central processing unit ("CPU"), can include any general or special-purpose processor capable of executing machine readable instructions and performing operations on data as instructed by the machine readable instructions. Main memory 603 may be directly accessible to processor 602 for accessing machine instructions and may be in the form of random access memory ("RAM") or any type of dynamic storage (e.g., dynamic random access memory ("DRAM")). Secondary storage 604 can be any non-volatile memory such as a hard disk, which is capable of storing electronic data including executable software files. Externally stored electronic data may be provided to computer 600 through one or more removable media drives 608, which may be configured to receive any type of external media such as compact discs ("CDs"), digital video discs ("DVDs"), flash drives, external hard drives, etc.

Wireless and wired network interfaces 605 and 606 can be provided to enable electronic communication between machine 600 and other machines. In one example, wireless network interface 605 could include a wireless network controller ("WNIC") with suitable transmitting and receiving components, such as transceivers, for wirelessly communicating within a network. Wired network interface 606 can enable machine 600 to physically connect to a network by a wire line such as an Ethernet cable. Both wireless and wired network interfaces 605 and 606 may be configured to facilitate communications using suitable communication protocols such as, for example, Internet Protocol Suite ("TCP/IP"). Machine 600 is shown with both wireless and wired network interfaces 605 and 606 for illustrative purposes only. While one or more wireless and hardwire interfaces may be provided in machine 600, or externally connected to machine 600, only one connection option is needed to enable connection of machine 600 to a network.

A user interface 607 may be provided in some machines to allow a user to interact with the machine 600. User interface 607 could include a display device such as a graphical display device (e.g., plasma display panel ("PDP"), a liquid crystal display ("LCD"), a cathode ray tube ("CRT"), etc.). In addition, any appropriate input mechanism may also be included such as a keyboard, a touch screen, a mouse, a trackball, voice recognition, touch pad, etc.

Removable media drive 608 represents a drive configured to receive any type of external computer-readable media (e.g., computer-readable medium 609). Instructions embodying the activities or functions described herein may be stored on one or more external computer-readable media. Additionally, such instructions may also, or alternatively, reside at least partially within a memory element (e.g., in main memory 603 or cache memory of processor 602) of machine 600 during execution, or within a non-volatile memory element (e.g., secondary storage 604) of machine 600. Accordingly, other memory elements of machine 600 also constitute computer-readable media. Thus, "computer-readable medium" is meant to include any medium that is capable of storing instructions for execution by machine 600 that cause the machine to perform any one or more of the activities disclosed herein.

Not shown in FIG. 6 is additional hardware that may be suitably coupled to processor 602 and other components in the form of memory management units ("MMU"), additional symmetric multiprocessing ("SMP") elements, physical memory, peripheral component interconnect ("PCI") bus and corresponding bridges, small computer system interface ("SCSI")/integrated drive electronics ("IDE") elements, etc. Machine 600 may include any additional suitable hardware, software, components, modules, interfaces, or objects that facilitate the operations thereof. This may be inclusive of appropriate algorithms and communication protocols that allow for the effective protection and communication of data. Furthermore, any suitable operating system may also be configured in machine 600 to appropriately manage the operation of the hardware components therein.

The elements, shown and/or described with reference to machine 600, are intended for illustrative purposes and are not meant to imply architectural limitations of machines such as those utilized in accordance with the present disclosure. In addition, each machine may include more or fewer components where appropriate and based on particular needs. As used herein in this Specification, the term "machine" is meant to encompass any computing device or network element such as servers, routers, personal computers, client computers, network appliances, switches, bridges, gateways, processors, load balancers, wireless LAN controllers, firewalls, or any other suitable device, component, element, or object operable to affect or process electronic information in a network environment.

In example implementations, at least some portions of the activities related to the system described herein (e.g., the steps shown in FIG. 4) may be implemented in software in, for example, leaf nodes. In some embodiments, this software could be received or downloaded from a web server, provided on computer-readable media, or configured by a manufacturer of a particular element in order to provide this system for implementing autonomic LISP for enabling a secure hybrid cloud extension in accordance with features of embodiments described herein. In some embodiments, one or more of these features may be implemented in hardware, provided external to these elements, or consolidated in any appropriate manner to achieve the intended functionality.

In one example implementation, leaf and spine nodes are network devices or computing devices, which may include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information.

Furthermore, in the embodiments of the system described and shown herein, some of the processors and memory elements associated with the various network elements may be removed, or otherwise consolidated such that a single processor and a single memory location are responsible for certain activities. Alternatively, certain processing functions could be separated and separate processors and/or physical machines could implement various functionalities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of the example embodiments, one or more memory elements (e.g., main memory 603, secondary storage 604, computer-readable medium 609) can store data used for the operations described herein. This includes at least some of the memory elements being able to store instructions (e.g., software, logic, code, etc.) that are executed to carry out the activities described in this Specification. A processor can execute any type of instructions associated with the data to achieve the operations detailed herein in this Specification. In one example, one or more processors (e.g., processor 602) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array ("FPGA"), an erasable programmable read only memory ("EPROM"), an electrically erasable programmable read only memory ("EEPROM")), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

Components of networks illustrated herein may keep information in any suitable type of memory (e.g., random access memory ("RAM"), read-only memory ("ROM"), erasable programmable ROM ("EPROM"), electrically erasable programmable ROM ("EEPROM"), etc.), software, hardware, or in any other suitable component, device, element, or object where appropriate and based on particular needs. Any of the memory items discussed herein should be construed as being encompassed within the broad term "memory element." The information being read, used, tracked, sent, transmitted, communicated, or received by network 10 could be provided in any database, register, queue, table, cache, control list, or other storage structure, all of which can be referenced at any suitable timeframe. Any such storage options may be included within the broad term "memory element" as used herein. Similarly, any of the potential processing elements and modules described in this Specification should be construed as being encompassed within the broad term "processor."

It should be noted that much of the infrastructure discussed herein can be provisioned as part of any type of network element. As used herein, the term "network element" or "network device" can encompass computers, servers, network appliances, hosts, routers, switches, gateways, bridges, virtual equipment, load-balancers, firewalls, processors, modules, or any other suitable device, component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information.

In one implementation, network elements/devices can include software to achieve (or to foster) the management activities discussed herein. This could include the implementation of instances of any of the components, engines, logic, etc. shown in the FIGURES. Additionally, each of these devices can have an internal structure (e.g., a processor, a memory element, etc.) to facilitate some of the operations described herein. In other embodiments, these management activities may be executed externally to these devices, or included in some other network element to achieve the intended functionality. Alternatively, these network devices may include software (or reciprocating software) that can coordinate with other network elements in order to achieve the management activities described herein. In still other embodiments, one or several devices may include any suitable algorithms, hardware, software, components, modules, interfaces, or objects that facilitate the operations thereof.

Note that with the numerous examples provided herein, interaction may be described in terms of two, three, four, or more network elements. However, this has been done for purposes of clarity and example only. It should be appreciated that the system can be consolidated in any suitable manner. Along similar design alternatives, any of the illustrated computers, modules, components, and elements of the FIGURES may be combined in various possible configurations, all of which are clearly within the broad scope of this Specification. In certain cases, it may be easier to describe one or more of the functionalities of a given set of flows by only referencing a limited number of network elements. It should be appreciated that the system as shown in the FIGURES and its teachings are readily scalable and can accommodate a large number of components, as well as more complicated/sophisticated arrangements and configurations. Accordingly, the examples provided should not limit the scope or inhibit the broad teachings of the system as potentially applied to a myriad of other architectures.

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

In the foregoing description, for purposes of explanation, numerous specific details are set forth in order to provide a thorough understanding of the disclosed embodiments. It will be apparent to one skilled in the art, however, that the disclosed embodiments may be practiced without these specific details. In other instances, structure and devices are shown in block diagram form in order to avoid obscuring the disclosed embodiments. In addition, references in the Specification to "one embodiment", "example embodiment", "an embodiment", "another embodiment", "some embodiments", "various embodiments", "other embodiments", "alternative embodiment", etc. are intended to mean that any features (e.g., elements, structures, modules, components, steps, operations, characteristics, etc.) associated with such embodiments are included in one or more embodiments of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method comprising:
receiving at a first node in a communications network a Session Traversal Utilities for Network Address Translation ("STUN") message associated with a flow, wherein the STUN message comprises a flow treatment attribute comprising a Retransmission Time-Out ("RTO") field that includes a time increment value indicating a maximum amount of time that a first packet of the flow may be retained in a queue of a network element before the first packet is discarded, wherein the flow treatment attribute includes a Maximum Retransmission Tries ("MRT") field that includes a value indicating a maximum number of times a second packet may be retransmitted before the second packet is discarded from the queue of the network element;
analyzing the flow treatment attribute at the first node;
setting a policy for treatment of the flow in the communications network at the first node based on the analyzing, wherein setting the policy includes using the flow treatment attribute of the STUN message to create a dedicated bearer for the flow; and
forwarding the STUN message to a next network node.

2. The method of claim 1, wherein the STUN message is transmitted on a same network path as the flow.

3. The method of claim 1 further comprising updating the flow treatment attribute at the first node.

4. The method of claim 1, wherein setting the policy comprises the communications network marking packets of the flow with an appropriate Differentiated Services Code Point ("DSCP") value to provide preferential network treatment to the packets of the flow.

5. The method of claim 1, wherein setting the policy comprises causing an access network connected to the communications network to provide preferential access to user equipment.

6. The method of claim 1, wherein the time increment value is one millisecond.

7. The method of claim 1, wherein setting the policy further includes initiating a request to create the dedicated bearer via a Request Bearer Resource Modification message.

8. The method of claim 1, wherein setting the policy includes using information in the STUN message to authorize a Create Dedicated Bearer request.

9. One or more non-transitory tangible media that includes code for execution and when executed by a processor is operable to perform operations comprising:
receiving at a first node in a communications network a Session Traversal Utilities for Network Address Translation ("STUN") message associated with a flow, wherein the STUN message comprises a flow treatment attribute comprising a Retransmission Time-Out ("RTO") field that includes a time increment value indicating a maximum amount of time that a first packet of the flow may be retained in a queue of a network element before the first packet is discarded, wherein the flow treatment attribute includes a Maximum Retransmission Tries ("MRT") field that includes a value indicating a maximum number of times a second packet may be retransmitted before the second packet is discarded from the queue of the network element;
analyzing the flow treatment attribute at the first node;
setting a policy for treatment of the flow in the communications network at the first node based on the analyzing, wherein setting the policy includes using the flow treatment attribute of the STUN message to create a dedicated bearer for the flow; and
forwarding the STUN message to a next network node.

10. The media of claim 9, wherein the STUN message is transmitted on a same network path as the flow.

11. The media of claim 9, wherein the operations further include updating the flow treatment attribute at the first node.

12. The media of claim 9, wherein the time increment value is around millisecond.

13. The media of claim 9, wherein setting the policy further includes initiating a request to create the dedicated bearer via a Request Bearer Resource Modification message.

14. The media of claim 9, wherein setting the policy includes using information in the STUN message to authorize a Create Dedicated Bearer request.

15. An apparatus comprising:
a memory element configured to store data; and
a processor operable to execute instructions associated with the data;
the apparatus configured for:
receiving a Session Traversal Utilities for Network Address Translation ("STUN") message associated with a flow, wherein the STUN message comprises a flow treatment attribute comprising a Retransmission Time-Out ("RTO") field that includes a time increment value indicating a maximum amount of time that a first packet of the flow may be retained in a queue of a network element before the first packet is discarded, wherein the flow treatment attribute includes a Maximum Retransmission Tries ("MRT") field that includes a value indicating a maximum number of times a second packet may be retransmitted before the second packet is discarded from the queue of the network element;
analyzing the flow treatment attribute at a first node;
setting a policy for treatment of the flow in a network at the first node based on the analyzing, wherein setting the policy includes using the flow treatment attribute of the STUN message to create a dedicated bearer for the flow; and forwarding the STUN message to a next network node.

16. The apparatus of claim 15, wherein the STUN message is transmitted on a same network path as the flow.

17. The apparatus of claim 15, wherein the apparatus is further configured to update the flow treatment attribute at the first node.

18. The apparatus of claim 15, wherein the time increment value is one millisecond.

19. The apparatus of claim 15, wherein setting the policy further includes initiating a request to create the dedicated bearer via a Request Bearer Resource Modification message.

20. The apparatus of claim 15, wherein setting the policy includes using information in the STUN message to authorize a Create Dedicated Bearer request.

* * * * *